(12) United States Patent
Yale et al.

(10) Patent No.: US 9,441,474 B2
(45) Date of Patent: Sep. 13, 2016

(54) SYSTEMS AND METHODS FOR INJECTING A PARTICULATE MIXTURE

(75) Inventors: David P. Yale, Katy, TX (US); Andrey A. Troshko, Pearland, TX (US); Sergio A. Leonardi, Pearland, TX (US); Neal L. Adair, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 216 days.

(21) Appl. No.: 13/989,032

(22) PCT Filed: Sep. 29, 2011

(86) PCT No.: PCT/US2011/053976
§ 371 (c)(1),
(2), (4) Date: May 22, 2013

(87) PCT Pub. No.: WO2012/082216
PCT Pub. Date: Jun. 21, 2012

(65) Prior Publication Data
US 2013/0240210 A1 Sep. 19, 2013

Related U.S. Application Data

(60) Provisional application No. 61/424,464, filed on Dec. 17, 2010.

(51) Int. Cl.
*E21B 43/267* (2006.01)
*C09K 8/504* (2006.01)
*C09K 8/57* (2006.01)
(Continued)

(52) U.S. Cl.
CPC ............. *E21B 43/267* (2013.01); *C09K 8/504* (2013.01); *C09K 8/57* (2013.01); *E21B 21/062* (2013.01); *E21B 21/066* (2013.01); *E21F 15/00* (2013.01); *C09K 2208/18* (2013.01)

(58) Field of Classification Search
CPC . E21B 43/267; C09K 2208/18; C09K 8/504; C09K 8/57
USPC .............................. 166/305.1, 252.5, 250.02
See application file for complete search history.

(56) References Cited

U.S. PATENT DOCUMENTS 3,340,693 A 9/1967 Row
3,396,786 A 8/1968 Schuster et al.
3,440,824 A 4/1969 Doolin
(Continued)

FOREIGN PATENT DOCUMENTS

WO WO/2007/050180 4/2007

OTHER PUBLICATIONS

Chilton, R.A., et al. (1998), "Pressure loss equations for laminar and turbulent non-Newtonian pipe flow," Journal of Hydraulic Engineering, 124 (5), 522-529.
(Continued)

*Primary Examiner* — Doug Hutton, Jr.
*Assistant Examiner* — Silvana Runyan
(74) *Attorney, Agent, or Firm* — ExxonMobil Upstream Research Company Law Department

(57) ABSTRACT

A method of backfilling a subsurface formation that includes forming a mixture tailings from at least two sources that have particles with different size distributions. The water content of the mixture is varied to control the rheology of the mixture. The mixture is injected through one or more pipes into a target location, such as a subsurface formation.

33 Claims, 14 Drawing Sheets

(51) Int. Cl.
*E21B 21/06* (2006.01)
*E21F 15/00* (2006.01)

(56) References Cited

U.S. PATENT DOCUMENTS

| | | | |
|---|---|---|---|
| 3,508,407 A | | 4/1970 | Booth |
| 3,528,501 A * | | 9/1970 | Parker ............... 166/266 |
| 3,608,317 A | | 9/1971 | Landau |
| 3,786,639 A | | 1/1974 | Pineno et al. |
| 3,838,738 A * | | 10/1974 | Redford et al. ............ 166/271 |
| 4,051,900 A * | | 10/1977 | Hankins ............ 166/280.2 |
| 4,059,963 A | | 11/1977 | Wayment |
| 4,101,333 A | | 7/1978 | Wayment |
| 4,946,597 A | | 8/1990 | Sury |
| 4,968,187 A | | 11/1990 | Burnett |
| 5,109,933 A | | 5/1992 | Jackson |
| 5,141,365 A | | 8/1992 | Smart |
| 5,340,235 A | | 8/1994 | Milliken |
| 5,645,714 A | | 7/1997 | Strand et al. |
| 5,705,812 A | | 1/1998 | Brewer et al. |
| 5,823,631 A | | 10/1998 | Herbolzheimer et al. |
| 6,168,352 B1 | | 1/2001 | Chen et al. |
| 6,297,295 B1 | | 10/2001 | Gay et al. |
| 6,431,796 B1 | | 8/2002 | Goldsack et al. |
| 6,554,368 B2 | | 4/2003 | Drake et al. |
| 6,640,912 B2 | | 11/2003 | Reddoch |
| 6,910,411 B2 | | 6/2005 | Reddoch |
| 7,004,255 B2 * | | 2/2006 | Boney ............ 166/280.2 |
| 7,069,990 B1 | | 7/2006 | Bilak |
| 7,100,994 B2 | | 9/2006 | Vinegar et al. |
| 7,569,137 B2 | | 8/2009 | Hyndman et al. |
| 7,571,080 B2 | | 8/2009 | Guo et al. |
| 8,490,699 B2 * | | 7/2013 | Panga et al. ............ 166/278 |
| 2003/0160500 A1 * | | 8/2003 | Drake et al. ............ 299/8 |
| 2003/0217866 A1 * | | 11/2003 | deBoer ............ 175/66 |
| 2005/0049150 A1 * | | 3/2005 | Patel et al. ............ 507/136 |
| 2005/0150844 A1 * | | 7/2005 | Hyndman et al. ............ 210/750 |
| 2005/0241835 A1 | | 11/2005 | Burris, II et al. |
| 2006/0207795 A1 * | | 9/2006 | Kinder et al. ............ 175/38 |
| 2007/0014188 A1 * | | 1/2007 | Cymbalisty ............ 366/336 |
| 2007/0022802 A1 * | | 2/2007 | Rogers et al. ............ 73/53.01 |
| 2007/0197851 A1 | | 8/2007 | Rogers et al. |
| 2008/0122286 A1 | | 5/2008 | Brock et al. |
| 2008/0149542 A1 | | 6/2008 | Bjornson et al. |
| 2008/0179092 A1 | | 7/2008 | Fragachan |
| 2009/0020458 A1 | | 1/2009 | Bozak et al. |
| 2010/0298174 A1 * | | 11/2010 | Tehrani et al. ............ 507/104 |
| 2011/0232907 A1 * | | 9/2011 | Bryant et al. ............ 166/300 |

OTHER PUBLICATIONS

Cooke, R, (2001) "Design procedure for hydraulic backfill distribution systems," *The Journal of The South African Institute of Mining and Metallurgy*, Mar./Apr. 2001, pp. 97-102.

Corti et al., (1988) "Athabasca Mineable Oil Sands: The RTR/Gulf Extraction Process Theoretical Model of Bitumen Detachment," *The 4th UNITAR/UNDP International Conference on Heavy Crude and Tar Sands Proceedings*, vol. 5, Edmonton, AB, Aug. 7-12, pp. 41-44, 71.

Mangesana N, et al. (2008), "The effect of particle sizes and solids concentration on the rheology of silica sand based suspensions", *Journal of the Southern African Institute of Mining and Metallurgy*, 108, 237-243.

PCT/US11/53976 International Search Report dated Feb. 15, 2012.

Canadian Application No. 2,821,930: Office Action dated Mar. 17, 2015 for Corresponding Canadian Application.

* cited by examiner

200

300

400

700

SYSTEMS AND METHODS FOR INJECTING A PARTICULATE MIXTURE

CROSS-REFERENCE TO RELATED APPLICATION

This application is the National Stage of International Application No. PCT/US2011/053976, filed 29 Sep. 2011, which claims the priority benefit of U.S. Provisional Patent Application 61/424,464 filed 17 Dec. 2010 entitled SYSTEMS AND METHODS FOR INJECTING A PARTICULATE MIXTURE, the entirety of which is incorporated by reference herein.

FIELD

The present techniques relate to permeability control of a solid-liquid slurry. More specifically, the techniques relate to methods and systems of permeability control of a slurry stream formed by mixing two or more different solid-fluid mixture streams.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Modern society is greatly dependant on the use of hydrocarbons for fuels and chemical feedstocks. Hydrocarbons are generally found in subsurface rock formations that can be termed "reservoirs." Removing hydrocarbons from the reservoirs depends on numerous physical properties of the rock formations, such as the permeability of the rock containing the hydrocarbons, the ability of the hydrocarbons to flow through the rock formations, and the proportion of hydrocarbons present, among others.

Easily harvested sources of hydrocarbon are dwindling, leaving less accessible sources to satisfy future energy needs. However, as the costs of hydrocarbons increase, these sources become attractive. Recently, the harvesting of oil sands to remove bitumen has become economical. Hydrocarbon removal from the oil sands may be performed by several techniques. For example, a well can be drilled to an oil sand reservoir and steam, hot air, solvents, or a combination thereof, can be injected to release the hydrocarbons. The released hydrocarbons may then be collected and brought to the surface. In another technique, strip or surface mining may be performed to access the oil sands, which can then be treated with hot water or steam to extract the oil. However, this technique produces a substantial amount of waste or tailings that must be disposed. Traditionally in the oil sand industry, tailings are disposed of in tailings ponds.

One process for harvesting oil sands that generates less waste is the slurrified heavy oil reservoir extraction process. In the slurrified heavy oil reservoir extraction process, the entire contents of a reservoir, including sand and hydrocarbon, can be extracted from the subsurface via wellbores for processing at the surface to remove the hydrocarbons. The tailings are then reinjected via wellbores back into the subsurface to prevent subsidence of the reservoir and allow the process to sweep the hydrocarbon bearing sands from the reservoir to the wellbores producing the slurry.

U.S. Pat. No. 5,832,631 to Herbolzheimer et al. discloses one such slurrified hydrocarbon recovery process that uses a slurry that is injected into a reservoir. In this process, hydrocarbons that are trapped in a solid media, such as bitumen in oil sands, can be recovered from deep formations. The process is performed by relieving the stress of the overburden and causing the formation to flow from an injection well to a production well, for example, by fluid injection. A tar sand/water mixture is recovered from the production well. The bitumen is separated from the sand and the remaining sand is reinjected in a water slurry.

International Patent Application No. WO/2007/050180, by Yale and Herbolzheimer, discloses an improved slurrified heavy oil recovery process. The application discloses a method for recovering heavy oil that includes accessing a subsurface formation, from two or more locations. The formation may include heavy oil and one or more solids. The formation is pressurized to a pressure sufficient to relieve the overburden stress. A differential pressure is created between the two or more locations to provide one or more high pressure locations and one or more low pressure locations. The differential pressure is varied within the formation between the one or more high pressure locations and the one or more low pressure locations to mobilize at least a portion of the solids and a portion of the heavy oil in the formation. The mobilized solids and heavy oil then flow toward the one or more low pressure locations to provide a slurry comprising heavy oil, water and one or more solids. The slurry comprising the heavy oil and solids is flowed to the surface where the heavy oil is recovered from the one or more solids. The one or more solids are recycled to the formation, for example, as backfill.

Backfill systems for reinjection of tailings in mining operations fall into two major flow categories. See Cooke, "Design procedure for hydraulic backfill distribution systems," The Journal of The South African Institute of Mining and Metallurgy, March/April 2001, pp. 97-102 (hereinafter "Cooke 2001"). The first category is a free fall flow and the second category is a full flow or continuous flow.

The free fall systems are categorized by low flow rates such that gravity force is larger than friction force on a slurry, so that the slurry falls freely in the pipe until it reaches the free surface. The advantage of such a system is its tolerance to variations in tailings stream properties, such as solids volume concentration and flow rate. However, the backfilling pipes may often have a short life span. The reasons behind the short pipe life span include the impact damage of slurry freely falling with speeds of up to 45 m/s, high impact pressure when slurry hits the free surface, high erosion rates when slight deviations from vertical occur in free fall region, and excessive pressure in the event of pipeline blockage.

The continuous systems are categorized by slurry occupying the full length of the reinjection well and the pipelines without any area of free fall. The advantage of this method is a much longer pipe life span as the free fall associated modes of pipe wear may be decreased. However, a fairly high backfill flow rate must be maintained so that friction loss is equal or greater than the backfill weight. Such systems may be sensitive to changes in flow rate and slurry rheology. Therefore, friction regulating/augmenting devices such as liners, valves, breaks or, more often, through solids volume concentration regulation are common. However, if the formation in the immediate vicinity of the injection represents a significant resistance to the backfill flow, then a large backpressure will develop which will support the weight of the backfill.

Most modern backfilling systems in mining operations are of the continuous type. Generally, hydraulic backfills are classified as slurries and pastes (See Cooke 2001). Slurries are characterized by a low fraction of small particles or fines, for example, less than about 75 μm, and volume concentrations equal to or less than particle constant contact solid concentration, i.e., the volume concentration at or above which particles start developing permanent contacts with each other. Pastes, on the other hand, have large fines content and volume concentrations exceeding constant contact solid concentration, for example, about 45-50%. Previous art in this area is strongly related to particle size control and slurry distribution systems.

As suggested above, many efforts have been made previously in this area. Among the prior U.S. patents related to the technology disclosed herein, the following non-exclusive list is representative of those efforts: U.S. Pat. Nos. 3,508,407; 4,968,187; 3,340,693; 6,168,352; 3,786,639; 3,440,824; 5,141,365 4,101,333; 3,608,317; 5,340,235; 6,297,295; 6,431,796; 6,554,368; 6,640,912; 6,910,411; 7,069,990; and 7,571,080. Additionally, published U.S. Patent Application Publication Nos. 2007/0197851 and 2008/0179092 are representative of more recent efforts in this area.

SUMMARY

A method of injecting a particulate mixture. The method includes forming a mixture comprising coarse particles and fine particles, wherein the mixture has a permeability in a predefined range. A fluid content of the mixture is controlled to control a rheological property of the mixture. The mixture is injected through a pipe into a target location.

The target location may be a subsurface formation comprising bitumen and may be located at a depth of least about 50 meters. At least one solids stream comprises residual hydrocarbons. A mass-averaged median diameter of the coarse particles may be larger than a mass-averaged median diameter of the fine particles.

In some embodiments, fluid may be added to various components to control various properties. For example, a fluid stream may be added to the mixture to adjust a rheological property of the mixture, a density of the mixture, or both. A fluid stream may be added to a stream comprising the coarse particles to adjust a rheological property of the mixture, the density of the mixture, or both. A fluid stream may be added to a stream comprising the fine particles to adjust a rheological property of the mixture, the density of the mixture, or both.

In some embodiments, fluid may be removed from various components to control various properties. A fluid may be removed from the mixture to adjust a rheological property of the mixture, the density of the mixture, or both. A fluid may be removed from a stream comprising the coarse particles to adjust a rheological property of the mixture, the density of the mixture, or both. The fluid can be removed from the stream comprising the coarse particles by a centrifuge, a vacuum belt, a vibrating screen filter, or any combinations thereof. A fluid can be removed from a stream comprising the fine particles to adjust a rheological property of the mixture, the density of the mixture, or both. The fluid can be removed in a thickener. The fluid can be removed with an addition of coagulation agents. The rheological property of the mixture, a density of the mixture, or both, can be controlled to adjust a frictional pressure loss of the mixture during a flow through a pipe or a wellbore.

The ratio of mixing of particle sources may be controlled in embodiments to adjust a number of responses. For example, a ratio of mixing between particle sources can be controlled based, at least in part, on a real-time estimate of averaged particle sizes, particle size distributions, permeability, rheology, or density for at least one of the plurality of particle sources. A ratio of mixing between particle sources can be controlled to control, at least in part, an injection rate of the mixture. A ratio of mixing between particle sources can be controlled to control, at least in part, an erosion rate of the pipe due to the mixture flow. A ratio of mixing between particle sources can be controlled based, at least in part, on a real-time measurement of averaged particle sizes, particle size distributions, or rheology of one or more particle sources or the resulting mixture.

The permeability of the mixture may be between about 0.01 and about 10 times an initial permeability of a material in a subsurface formation. The rheological property of the mixture can be controlled so that the mixture does not free fall in the pipe during injection. The rheological property can be controlled, at least in part, by addition of a chemical additive. The chemical additive includes a polymer, a gelling agent, a flocculant, a pH modifier, or any combinations thereof. An injection pipe used to inject the mixture can include an inner pipe to reduce a cross-sectional flow space. The mixing may be performed at the surface in a blending apparatus or in a subsurface region by commingling of the outlets of two or more pipes.

Another embodiment provides a system for injecting a particulate mixture. The system includes a source of coarse particles, a source of fine particles, and a mixing subsystem which mixes coarse particles with fine particles to form a particulate mixture. The system includes an apparatus that can be used to alter a water content of a particulate flow; and a measurement system measuring a property of a particulate flow. A control system can adjust the mixing subsystem and/or a water content of at least one particular flow based, at least in part, on the measured property. An injection pipe injects the particulate mixture into a target location. The particulate flow can include the coarse particles, the fine particles, the particulate mixture, or any combinations thereof.

The measured property can include particle sizes, permeability, rheology, or flow rate of a particulate flow, or any combinations thereof. The apparatus to alter a fluid content can include a water source. The apparatus to alter a fluid content can include a water removal system. The measured property can include a ratio of mixing between a plurality of particle sources.

The control system can adjust the rheology of a particulate flow through addition of chemical additives.

Another embodiment provides a method for harvesting hydrocarbons from a reservoir. The method comprises drilling at least one injection well to a reservoir, drilling at least one production well to the reservoir, and producing a material from the production well, wherein the material comprises a mixture of particulate solids and hydrocarbons. At least a portion of the hydrocarbons may be removed from the material, and particulate streams are formed from the material. A mixture comprising at least two of the plurality of particulate streams is formed, wherein the ratio between each of the plurality of particulate streams is controlled to control a permeability of the mixture. A water content of the mixture is controlled to adjust a rheological property of the mixture. The mixture is injected through the injection well into the reservoir at substantially the same rate as production of the material from the reservoir.

A hydrocarbon removed from the material may be processed. The reservoir may include a hydrocarbon and a sand. For example, the reservoir may include bitumen. The re-injected mixture may include residual hydrocarbons.

DESCRIPTION OF THE DRAWINGS

The advantages of the present techniques are better understood by referring to the following detailed description and the attached drawings, in which.

DETAILED DESCRIPTION

Figure 1:
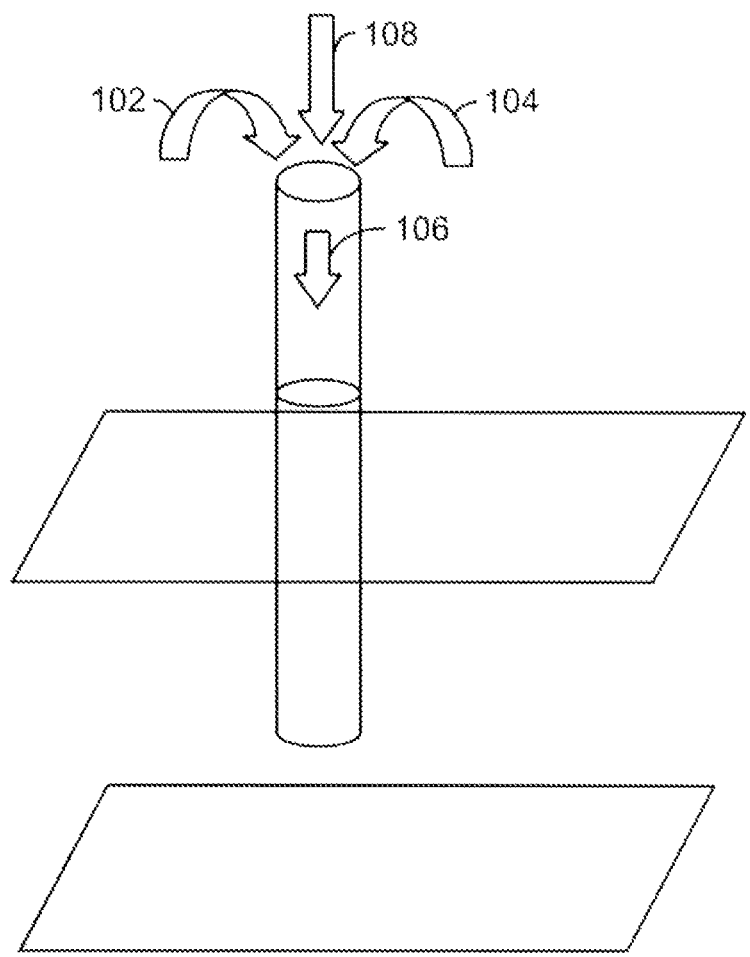
FIG. 1 is a diagram showing a slurrified backfilling process, illustrating three distinct streams that can be used.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Bitumen" is a naturally occurring heavy oil material. Generally, it is the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of:

19 wt. % aliphatics (which can range from 5 wt. %-30 wt. %, or higher);

19 wt. % asphaltenes (which can range from 5 wt. %-30 wt. %, or higher);

30 wt. % aromatics (which can range from 15 wt. %-50 wt. %, or higher);

32 wt. % resins (which can range from 15 wt. %-50 wt. %, or higher); and some amount of sulfur (which can range in excess of 7 wt. %).

In addition, bitumen can contain some water and nitrogen compounds ranging from less than 0.4 wt. % to in excess of 0.7 wt. %. The metals content, while small, must be removed to avoid contamination of the product synthetic crude oil (SCO). Nickel can vary from less than 75 ppm (part per million) to more than 200 ppm. Vanadium can range from less than 200 ppm to more than 500 ppm. The percentage of the hydrocarbon types found in bitumen can vary.

"Clark hot water extraction process" ("CHWE") was originally developed for releasing bitumen from oil sands, based on the work of Dr. K. A. Clark, and discussed in a paper by Corti et al., "Athabasca Mineable Oil Sands: The RTR/Gulf Extraction Process Theoretical Model of Bitumen Detachment," The 4th UNITAR/UNDP International Conference on Heavy Crude and Tar Sands Proceedings, vol. 5, Edmonton, AB, Aug. 7-12, 1988, pp. 41-44, 71. The process, which is also described in U.S. Pat. No. 4,946,597, uses vigorous mechanical agitation of the oil sands with water and caustic alkali to disrupt the granules and form a slurry, after which the slurry is passed to a separation tank for the flotation of the bitumen, or other hydrocarbons, from which the bitumen is skimmed. The process may be operated at ambient temperatures, with a conditioning agent being added to the slurry. Earlier methods used temperatures of 85° C., and above, together with vigorous mechanical agitation and are highly energy inefficient. Chemical adjuvants, particularly alkalis, have to be utilized to assist these processes.

The "front end" of the CHWE, leading up to the production of cleaned, solvent-diluted bitumen froth, will now be generally described. The as-mined oil sand is firstly mixed with hot water and caustic in a rotating tumbler to produce a slurry. The slurry is screened, to remove oversize rocks and the like. The screened slurry is diluted with additional hot water and the product is then temporarily retained in a thickener vessel, referred to as a primary separation vessel ("PSV"). In the PSV, bitumen globules contact and coat air bubbles which have been entrained in the slurry in the tumbler. The buoyant bitumen-coated bubbles rise through the slurry and form a bitumen froth. The sand in the slurry settles and is discharged from the base of the PSV, together with some water and a small amount of bitumen. This stream is referred to as "PSV underflow." "Middlings," including water containing non-buoyant bitumen and fines, collect in the mid-section of the PSV.

The froth overflows the lip of the vessel and is recovered in a launder. This froth stream is referred to as "primary" froth. It typically comprises 65 wt. % bitumen, 28 wt. % water, and 7 wt. % particulate solids.

The PSV underflow is introduced into a deep cone vessel, referred to as the tailings oil recovery vessel ("TORV"). Here the PSV underflow is contacted and mixed with a stream of aerated middlings from the PSV. Again, bitumen and air bubbles contact and unite to form buoyant globules that rise and form a froth. This "secondary" froth overflows the lip of the TORV and is recovered. The secondary froth typically comprises 45 wt. % bitumen, 45 wt. % water, and 10 wt. % solids. The underflows from the TORV, the flotation cells and the dilution centrifuging circuit are typically discharged as tailings into a pond system. In embodiments of the present techniques, the tailings are reinjected back into the formation as backfill. The reinjection both prevents subsidence as material is removed from the reservoir and also lowers environmental issues from the waste tailings. Water removed from the tailings during the reinjection process may be recycled for use as plant process water.

As used herein, a "compressor" includes any type of equipment designed to increase the pressure of a material, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example.

"Facility" as used in this description is a tangible piece of physical equipment through which hydrocarbon fluids are either produced from a reservoir or injected into a reservoir, or equipment which can be used to control production or completion operations. In its broadest sense, the term facility is applied to any equipment that may be present along the flow path between a reservoir and its delivery outlets. Facilities may comprise production wells, injection wells, well tubulars, wellhead equipment, gathering lines, manifolds, pumps, compressors, separators, surface flow lines, sand processing plants, and delivery outlets. In some instances, the term "surface facility" is used to distinguish those facilities other than wells. A "facility network" is the complete collection of facilities that are present in the model, which would include all wells and the surface facilities between the wellheads and the delivery outlets.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in bitumen, or other oil sands.

"Permeability" is the capacity of a rock or other material to transmit fluids through the interconnected pore spaces of the rock or material; the customary unit of measurement is the millidarcy. The term "relatively permeable" is defined, with respect to formations or portions thereof, as an average permeability of 10 millidarcy or more (for example, 10 or 100 millidarcy). The term "relatively low permeability" is defined, with respect to formations or portions thereof, as an average permeability of less than about 10 millidarcy. While permeability is typically considered in the context of a solid object, such as rock, it may also be relevant in the context of non-solid materials. For example, in the context of the present technology, the slurries injected into the formation are adapted to have selected permeabilities relative to the formation fluids. In some implementations, the slurries may be adapted to have low permeabilities relative to the formation fluids to push the formation fluids in front of the injected slurries rather than allowing the formation fluids to pass into or through the injected slurries.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

Figure 7:
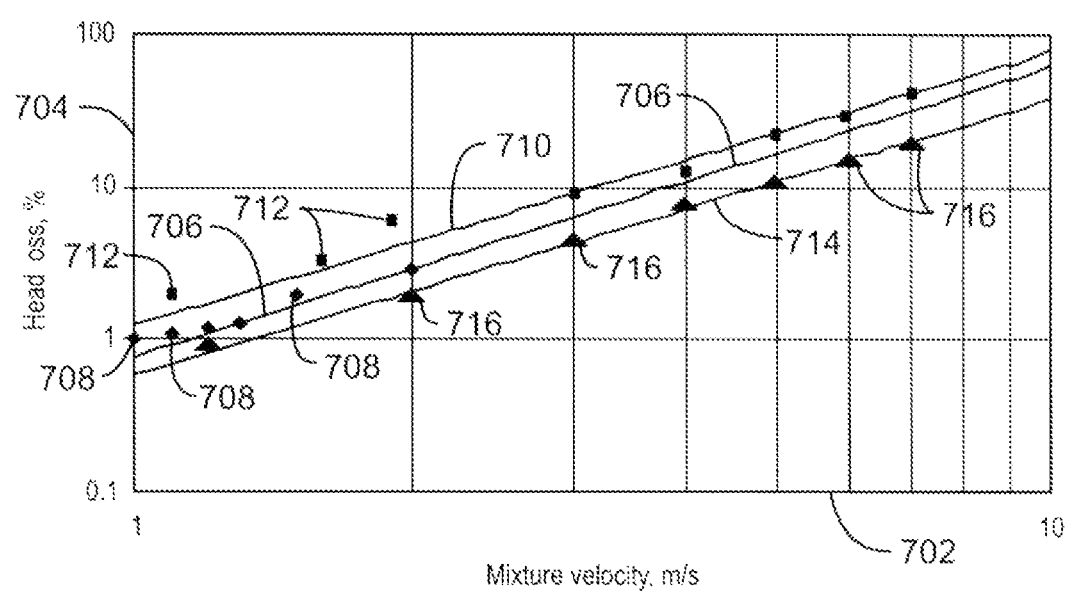
FIG. 7 is a graph comparing the calculated friction loss for a number of systems versus a measured friction loss.
Figure 8:
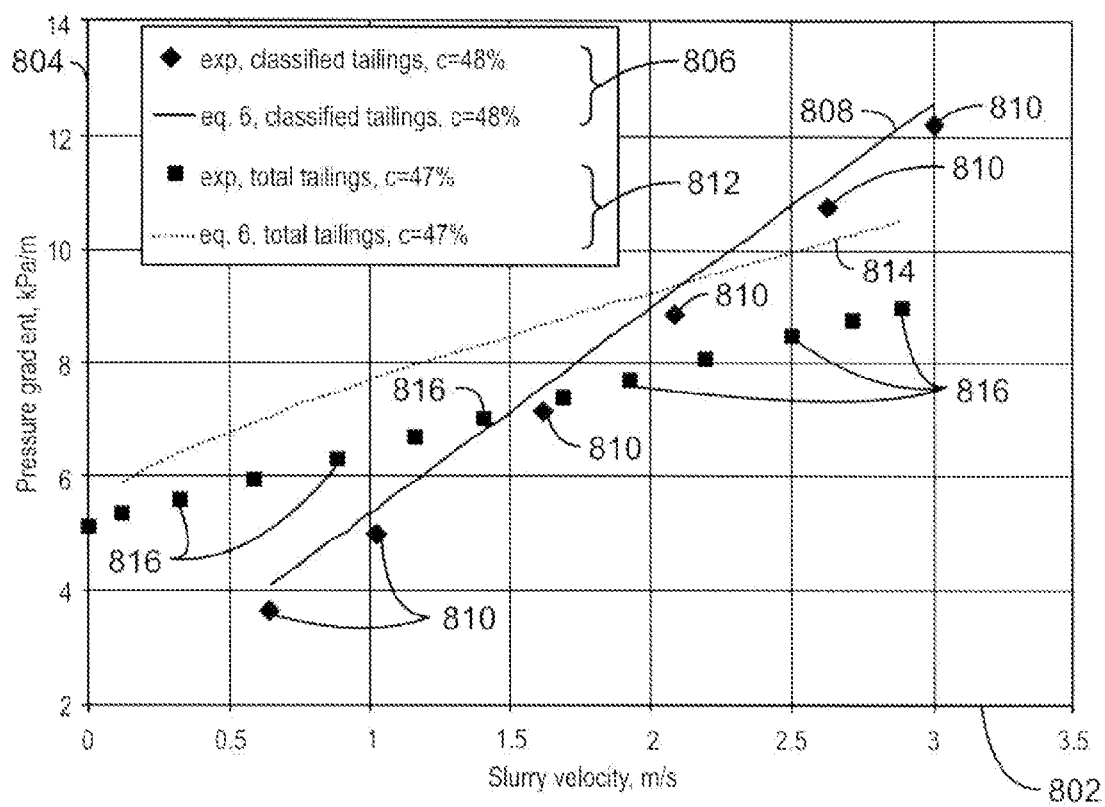
FIG. 8 is a graph comparing measured pressure gradients to predicted pressure gradients over a range of slurry velocities for two mixtures of tailings.

As used herein, "pressure gradient" represents the increase in back pressure seen when a flow rate of a fluid or slurry is increased. FIGS. 7 and 8 illustrate the application of pressure gradient versus superficial velocity for slurries. Pressure gradient may be measured by the methods described by Chilton, R. A. and Stainsby, R. "Pressure loss equations for laminar and turbulent non-Newtonian pipe flow," Journal of Hydraulic Engineering, 124 (5), 522-529 (1998).

As used herein, a "reservoir" is a subsurface rock formation from which a production fluid can be harvested. The rock formation may include granite, silica, carbonates, clays, and organic matter, such as oil, gas, or coal, among others. Reservoirs can vary in thickness from less than one foot (0.3048 m) to hundreds of feet (hundreds of m). The permeability of the reservoir provides the potential for production. As used herein a reservoir may also include a hot dry rock layer used for geothermal energy production. A reservoir may often be located at a depth of 50 meters or more below the surface of the earth or the seafloor.

A "rheological property" can include numerous stress-strain relationships, such as viscosity, deformation rates, flow rates, creep rates, elasticity, plasticity, and any other properties of a material under an applied strain. Such properties are discussed, for example, with respect to FIG. 4, below.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

A "wellbore" is a hole in the subsurface made by drilling or inserting a conduit into the subsurface. A wellbore may have a substantially circular cross section or any other cross-sectional shape, such as an oval, a square, a rectangle, a triangle, or other regular or irregular shapes. As used herein, the term "well", when referring to an opening in the formation, may be used interchangeably with the term "wellbore." Further, multiple pipes may be inserted into a single wellbore, for example, to limit frictional forces in any one pipe.

Overview

Embodiments of the present invention provide a method and a system for continuous backfilling of tailings, such as sand after oil has been removed, into a subterranean reservoir with control of the solid size distribution. For effective injection of tailings, two conditions can be met. First, the permeability of the backfill solids can be controlled within a predetermined range of about 0.01 to about 10 times of the initial permeability of the injected fluid through the porous material of the subsurface formation into which the mixture is injected. Second, the slurry rheology can be controlled to manage pipe pressure losses. Control of the tailings within these ranges is discussed in greater detail, below. When both criteria are met, the backfill may be placed correctly, water consumption can be optimal, and subsidence may be prevented. As tailing streams in real injection processes may vary over time, in embodiments a model can be used to predict the backfill operation in accord with the conditions above. Embodiments also include a control system running a mathematical algorithm and associated sensor, pipe, and pump systems, which may be used as inputs and outputs for the algorithm.

The control of the permeability of the backfill slurry is determined by the number of particles within certain size range per unit of slurry volume. Slurry rheology is affected by the particle size distribution of the slurry as well as by total solids concentration. Examples of permeability and rheology control are discussed in greater detail below.

FIG. 1 is a diagram showing an embodiment of a slurry stream mixing process 100 in accordance with embodiments. A coarse particle stream 102 can be characterized by total (fluid and solid) volume flow rate, $\dot{Q}_1$, the solids volume concentration, $c_1$, solids permeability, $k_1$, and characteristic solids diameter in meters, $d_1$. The characteristic solids diameter can be related to a measured permeability to water, $k_1$, and volume concentration, $c_1$, by the Blake-Kozeny equation, shown as Eqn. 1.

$$d_1 = \left[\frac{k_1 150 c_1^2}{(1-c_1)^3}\right]^{1/2} \qquad \text{Eqn. 1}$$

In such content, the diameter $d_1$ can be called a permeability diameter. As an example, the known permeability and concentration of clean Athabasca sand provides a value for $d_1$ in the range of about 70 µm to about 80 µm. A fines particle stream 104 can be characterized by a corresponding set of variables, $\dot{Q}_2$, $c_2$, $k_2$, and $d_2$. The typical permeability diameter of fines, $d_2$, is about 10 µm.

The resulting or mixed particulate slurry 106 can be formed by combining the coarse particle stream 102, the fines particle stream 104, and a fluid only stream 108, which can be characterized by a fluid flow rate $\dot{Q}_{f3}$. The fluid flow rate $\dot{Q}_{f3}$ can be positive when a fluid, such as water, is added to tailing streams, termed, "watering." It may also be negative when a fluid, such as water, is removed from the tailings streams, termed "dewatering." Either addition or removal of fluid ($\dot{Q}_{f3}$) to either or both tailing streams may be performed before they are mixed together or after they are mixed together.

Various embodiments described herein use the fundamental fluid and solids mass conservation laws of the steady state flow. The mass conservation laws for the solid and fluid phases, respectively, are shown in Eqn. 2.

$$\dot{Q}_1 c_1 + \dot{Q}_2 c_2 = \dot{Q}_4 c_4$$

$$\dot{Q}_1(1-c_1) + \dot{Q}(1-c_2) = \dot{Q}_4(1-c_4) - \dot{Q}_{f3} \qquad \text{Eqn. 2}$$

The conservation laws shown in Eqn. 2 can be extended to a general case of N tail streams mixing together. In the general case, the solid and fluid mass conservation equations from Eqn. 2 are as shown in Eqn. 2A.

$$\sum_{i=1}^{N} \dot{Q}_i c_i = \dot{Q}c \qquad \text{Eqn. 2A}$$

$$\sum_{i=1}^{N} \dot{Q}_i (1-c_i) = \dot{Q}(1-c) - \dot{Q}_f$$

In Eqn. 2A, $\dot{Q}$ represents a mixed slurry stream flow rate, corresponding to the stream $\dot{Q}_4$ in Eqn. 2 and displayed in FIG. 1 as the mixed particulate slurry 106. The volume concentration of the solids in Eqn. 2A is represented by c, which corresponds to $c_4$ in Eqn. 2. The watering/dewatering rate in Eqn. 2A is represented by $\dot{Q}_f$, which corresponds to $\dot{Q}_{f3}$ in Eqn. 2.

In general, the system in Eqn. 2A can be considered as incomplete as only two independent equations for N+1 unknown flow rates ($\dot{Q}_{i=1,N}$, $\dot{Q}_f$) are present. Therefore, the two equations in Eqn. 2A can be complemented by information about the desired solid size composition of the mixed slurry, which is characterized by N−1 known solid volume fractions $$\left\{f_i, i = \overline{1, N-1}, f_N \equiv 1 - \sum_{i=1}^{N-1} f_i\right\}$$

of the i-th tail stream in the mixed stream, as shown in Eqn. 3.

$$f_i = \frac{\dot{Q}_i c_i}{\sum_{i=1}^{N} \dot{Q}_i c_i}, i = \overline{1, N-1} \qquad \text{Eqn. 3}$$

The solution of the linear system represented by Eqns. 2A and 3 is shown in Eqn. 4.

$$\dot{Q}_i = \frac{\dot{Q} c f_i}{c_i} \qquad \text{Eqn. 4}$$

$$\dot{Q}_f = \dot{Q}\left[1 - c\sum_{i=1}^{N} \frac{f_i}{c_i}\right]$$

The formulas shown in Eqn. 4 provide flow rates for tailings streams plus fluid flow rate. These stream rates are computed given the volume concentrations of the streams and desired mixed slurry rate $\dot{Q}$ and its volume concentration, c.

Simplifying the general solution shown in Eqn. 4 to the case of coarse and fines tail streams leads to the formulas shown in Eqn. 4A.

$$\dot{Q}_1 = \frac{\dot{Q}_4 c_4 (1-f_4)}{c_1} \qquad \text{Eqn. 4A}$$

-continued $$\dot{Q}_2 = \frac{Q_4 c_4 f_4}{c_2}$$

$$\dot{Q}_{f3} = \dot{Q}_4 \left[ 1 - c_4 \left( \frac{(1-f_4)}{c_1} + \frac{f_4}{c_2} \right) \right]$$

In Eqn. 4A, $$f_4 = \frac{\dot{Q}_2 c_2}{\dot{Q}_1 c_1 + \dot{Q}_2 c_2},$$

which is the known fines content related to the mixed stream permeability. In an embodiment, Eqns. 4 and 4A may be used to provide a basis of the solid size distribution control dictated by the known solid volume fraction from each slurry stream. Solid size distribution of the mixed particulate slurry 106 affects the permeability of the mixed particulate slurry 106 and its rheology. Thus, permeability of the mixed particulate slurry 106 can be controlled by mixing of slurries containing two or more differently sized solid particle distributions, such as the coarse particle stream 102 and the fines particle stream 104. In contrast, in past studies, permeability has generally been controlled by modifying size distribution of a solid-liquid stream containing a single particle size distribution, for example, by the addition of bonding agents, polymers, and the like. Control of the slurry rheology is accomplished subsequent to the control of the permeability by controlling the solids concentration through adding or removing water.

Slurrified Reinjection of Tailings

Some embodiments of current invention include various mining or civil engineering operations which rely on backfilling (or reinjection or replacement) of part or the whole of material produced from the subsurface formation. In particular, in situ heavy oil mining operations, such as a slurrified heavy oil reservoir extraction method shown in FIG. 2, may benefit from the current invention.

Figure 2:
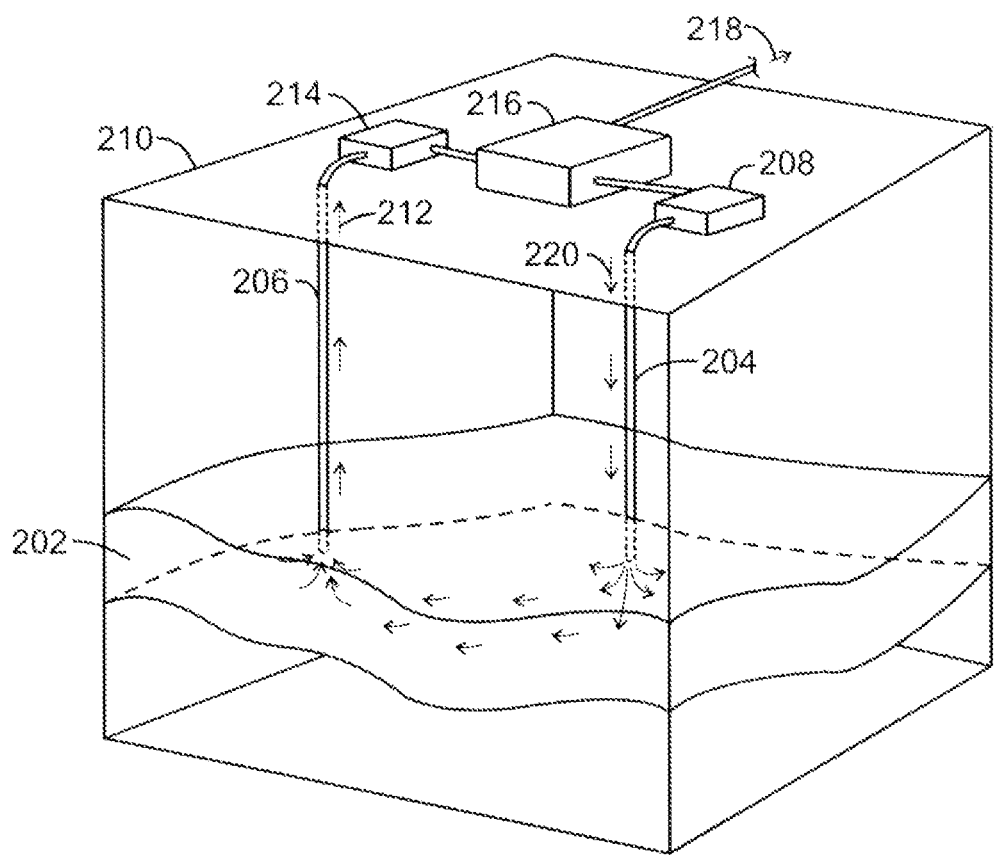
FIG. 2 is a diagram showing the use of a slurrified heavy oil reservoir extraction process to harvest hydrocarbons from a reservoir, such as an oil-sands deposit.

FIG. 2 is a diagram 200 showing the use of a slurrified heavy oil reservoir extraction process to harvest hydrocarbons from a reservoir, such as an oil sands deposit. The techniques described herein are not limited to the slurrified reservoir process but may be used with any number of other processes. For example, techniques described herein may be used to fill a separation column, fill in a subsurface cavity, or perform any number of other filling operations. In the diagram 200, a reservoir 202 is accessed by an injection well 204 and a production well 206. The reservoir is a subsurface formation that may be at a depth greater than about 50 meters. Water and tailings are injected through the injection well 204, for example, from a pumping station 208 at the surface 210. At the same time, hydrocarbon containing materials 212, such as oil sands, are harvested from the reservoir 202, for example, through another pumping station 214. The hydrocarbon containing materials 212 may be processed in a facility 216 to remove at least a portion of the hydrocarbons 218. The hydrocarbons 218 can be sent to other facilities for refining or further processing. The cleaned tailings 220, such as sand, or other particulates, may then be backfilled, i.e., reinjected into the reservoir 202, for example, to prevent subsidence of the surface 210. The injection and production wells are illustrated as single lines to the reservoir 202, but may include multiple wells.

Figure 3:
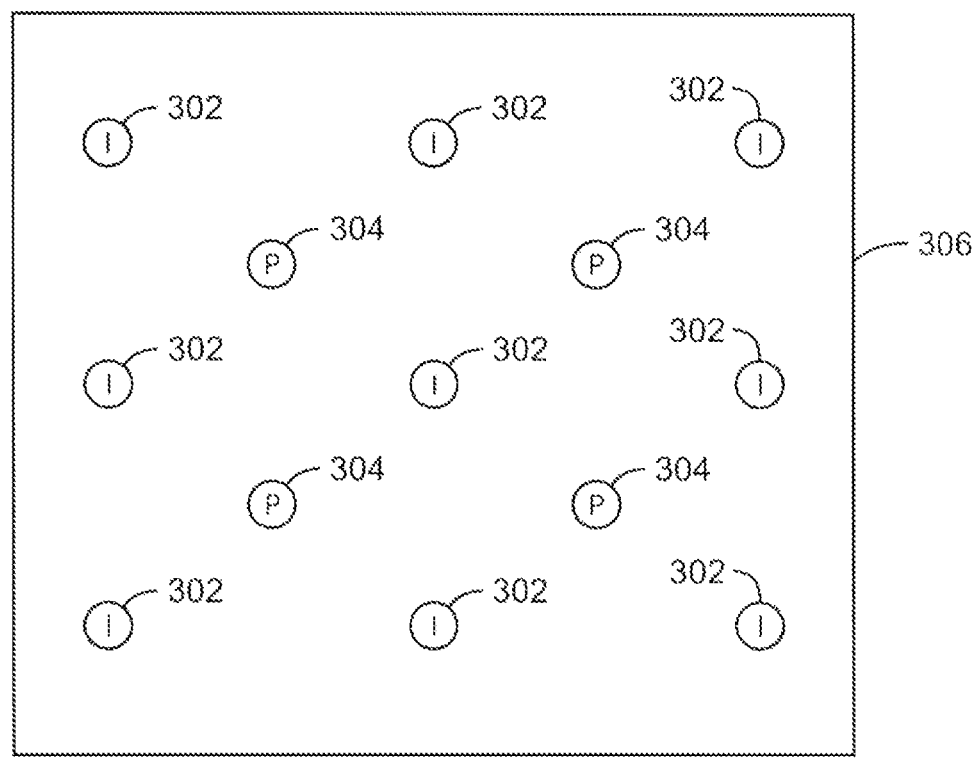
FIG. 3 is a diagram showing a pattern of injection wells and production wells over a hydrocarbon field.

FIG. 3 is a diagram showing a pattern 300 of injection wells 302 and production wells 304 over a hydrocarbon field 306. Generally, the number of injections wells 302 and production wells 304 may be matched to assist with maintaining a mass balance of material entering and exiting the reservoir. As shown in FIG. 3, the pattern may be regularly spaced across a field. In other embodiments, the wells 302 and 304 may be irregularly spaced, for example, placed to improve interaction with the reservoir geometry. Any number of other patterns may be used in embodiments.

Particle size distribution of the backfill solids (tailings) is a useful parameter as it determines a fluid-solid interaction. Therefore, control of the size distribution of the backfill solids is a desired capability. Solids concentration and size distribution are also parameters that influence frictional pressure loss. Therefore, continuous backfill considered along with pipe erosion influences the choice of the backfill piping size and design. Embodiments of the present techniques provide a methodology for backfill design that accounts for all three considerations, i.e., particulate size control, frictional pressure loss, and pipe erosion. Further, the rheology, or flow properties, of the tailings are affected by the particle size distribution and controlled by regulation of the water content.

Figure 4:
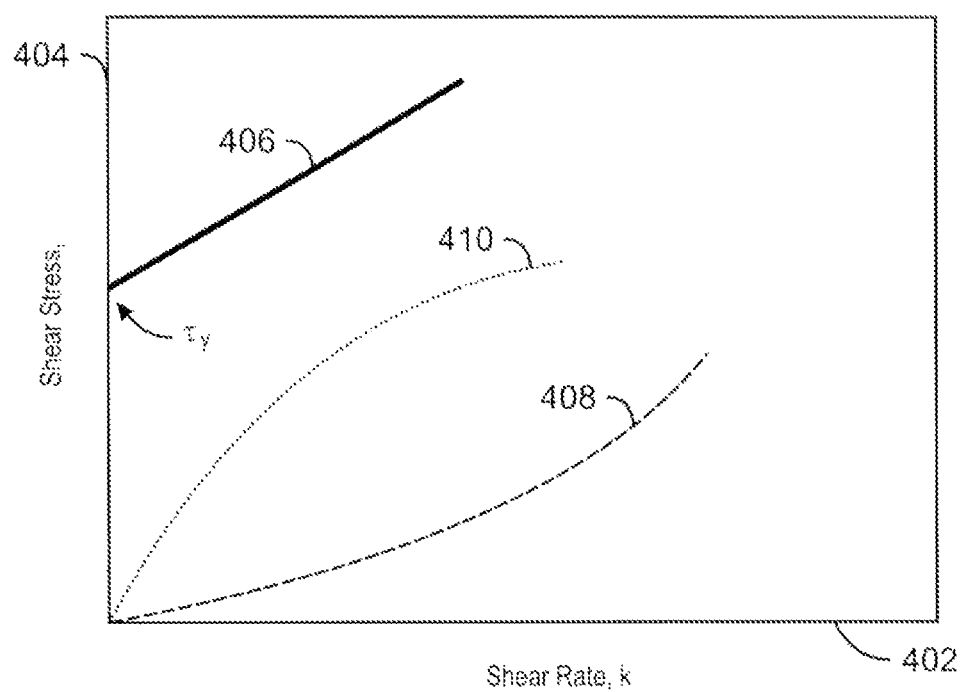
FIG. 4 is a graph of different rheological behaviors for various materials.

FIG. 4 is a graph 400 of different rheological behaviors for various solid-fluid mixtures. In the graph 400, the x-axis 402 represents an applied shear rate, while the y-axis 404 represents the shear stress resulting from the applied shear rate. In general, the rheology of tailings is frequently described by the Herschel-Bulkley model, known to those of skill in the art, which follows the formula shown in Eqn. 5.

$$\tau = \tau_Y + K \dot{y}^n \qquad \text{Eqn 5.}$$

In Eqn. 5, $\tau$ represents the measured shear stress, $\tau_Y$ represents the yield stress, K represents a consistency factor, and n represents a power law exponent. The yield stress $\tau_Y$ may be a function of various binders added to tailings for better strength. The yield stress may also be affected by tailings concentration. The consistency factor, K, and the power, n, are each a function of solids concentration and size distribution. For highly concentrated slurries and pastes, for example, with a solids concentration above the constant-contact solid concentration of about 45%, backfill behaves like a Bingham fluid 406, as understood by one of skill in the art, i.e., n=1 and $\tau_Y$>0. For lower solid concentrations dilatant flow 408 is often observed, in which n>1. In some cases, a slurry may function as a pseudoplastic fluid 410, in which n<1, as discussed further with respect to FIG. 7, below. Control of the rheological properties of the backfill may be achieved by controlling the content of particles of different sizes in the paste or slurry. The control may be assisted by the addition of chemical additives that change the rheology of the mixture, including materials such as polymers, gelling agents, coagulation agents (flocculants), or pH modifiers.

Figure 12:
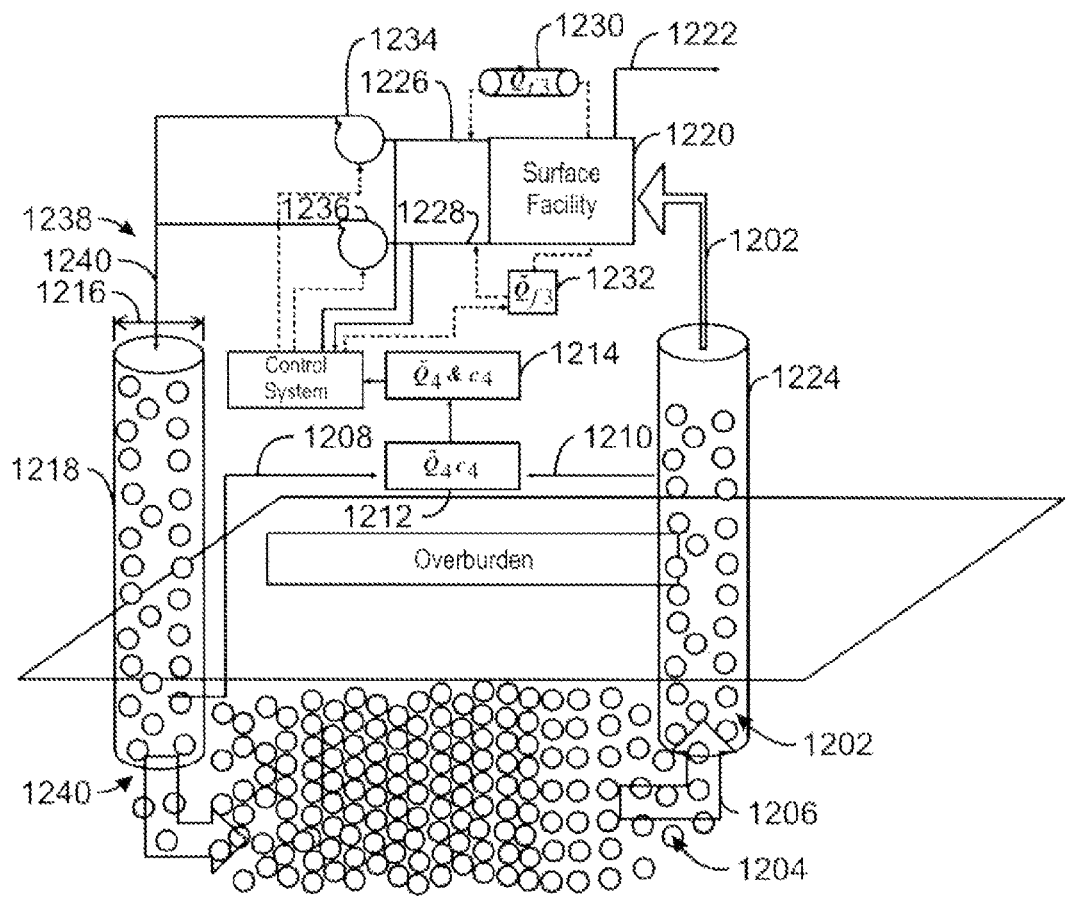
FIG. 12 is a block diagram of a slurrified backfill process.

The slurrified reservoir process produces at least two streams of tailings or particles, at least one coarse tailings stream and at least one fines tailing stream, as discussed with respect to FIG. 12. Generally, the mass-averaged median diameter of the coarse particles in the coarse tailings stream is larger than the mass-averaged median diameter of the particles in the fines tailing stream. The tailings can be watered, in which the solids concentration is reduced, or dewatered, in which the solids concentration is increased. This process is used herein as an example of a system that may be controlled by the current techniques. It will be apparent that the processes described herein are not limited to the slurrified reservoir process, but may be used with any tailings backfill process in which backfill permeability control would be useful.

Referring also to FIG. 1, if a Clark Hot Water separation process is used to extract bitumen froth from the oil sand produced by the slurrified reservoir process, a caustic soda may be added to aid bitumen liberation and flotation. As a result, solids in the fines particle stream 104 may have a double electrical layer on their surface that can prevent them from coming in direct contact with each other resulting in dispersed fines. Thus, the fines concentration in the fines particle stream 104 or the mixed particulate slurry 106 may not exceed a certain value below the direct particle contact limit. As a result, the dewatering or mixing of dispersed fines with coarse tailings is difficult to achieve. Addition of polymers or gypsum may be used to circumvent this charge effect.

Dewatering of the coarse particle stream 102 can be implemented in standard coarse solids dewatering apparatuses such as vacuum conveyors or centrifuges. These apparatuses typically operate close to the packing limit, i.e., the maximum achievable sand concentration, which, for a monodisperse grain size, may be in a range of about 0.57 to about 0.63. Some dewatering of the fines particle stream 104 can be done in a standard fines dewatering apparatuses such as a thickener vessel.

The permeability of a mixture of coarse particles and fine particles is mainly controlled by the quantity of smaller size solids, i.e., the fines. Known permeabilities of coarse and fines solids may be connected to their characteristic diameters by the formula shown in Eqn. 1. The average backfill permeability is assumed to be a result of the uniform mixture of coarse and fines particle streams. Based on this assumption, one exemplary model for backfill permeability may be approximated based on a volume weighted mixing rule as shown in Eqn. 6.

$$k_4 = \frac{(1-c_4)^3}{150c_4^2}\left(\frac{(1-f_4)}{d_1^2} + \frac{f_4}{d_2^2}\right)^{-1} \quad \text{Eqn. 6}$$

As a condition on Eqn. 6, the fines content may be restricted so that the ratio of in-situ permeability $k_5$ to backfill permeability would not exceed a predetermined limit, as shown in Eqn. 7.

$$k_5 \varepsilon \leq k_4 \quad \text{Eqn. 7}$$

Therefore, to satisfy the permeability restriction given in Eqn. 7, the fines fraction satisfies the restriction shown in Eqn. 8.

$$f_4 \leq f_{max}, f_{max} = \left[\frac{(1-c_4)^3}{\varepsilon k_5 c_4^2 150} - \frac{1}{d_1^2}\right]\left(\frac{1}{d_2^2} - \frac{1}{d_1^2}\right)^{-1} \quad \text{Eqn. 8}$$

Practically, as one of the backfill objectives is the reinjection of a maximum amount of fines, an equality can be used in Eqn. 8. Generally, the preferred range of permeability (under the conditions in the subsurface formation) of the backfill material may be about 0.01 to about 10 times of the initial permeability of the injected fluid through the porous material of the subsurface formation into which the mixture is injected.

Application to a Design of a Slurrified Reservoir Backfill Process

The algorithm described above was used for the design of a continuous flow backfill system for the slurrified reservoir process. To ensure continuous backfill flow, a force equilibrium must be established in backfill well. In particular, the weight of the backfill in the well must be balanced by the friction of the backfill slurry against the wall and by the downhole pressure, e.g., the back pressure on the slurry.

Depending on a particular production scenario a void may develop at the backfill well downhole. In such cases, continuous flow requires the backfill flow rate to be high enough to equalize gravity force with wall friction. Friction is a strong function of solids concentration so the required backfill flow rate $\dot{Q}_4$ is connected to solid concentration, $c_4$. With the rheology of the dense slurries specified using the Herschel-Bulkley model, as shown in Eqn. 5, above, a pressure gradient, $\nabla p$, which is caused by the friction of a fully developed slurry flow with a superficial velocity, U, moving downwards in a pipe of diameter, D, may be calculated by well know methods.

Figure 5:
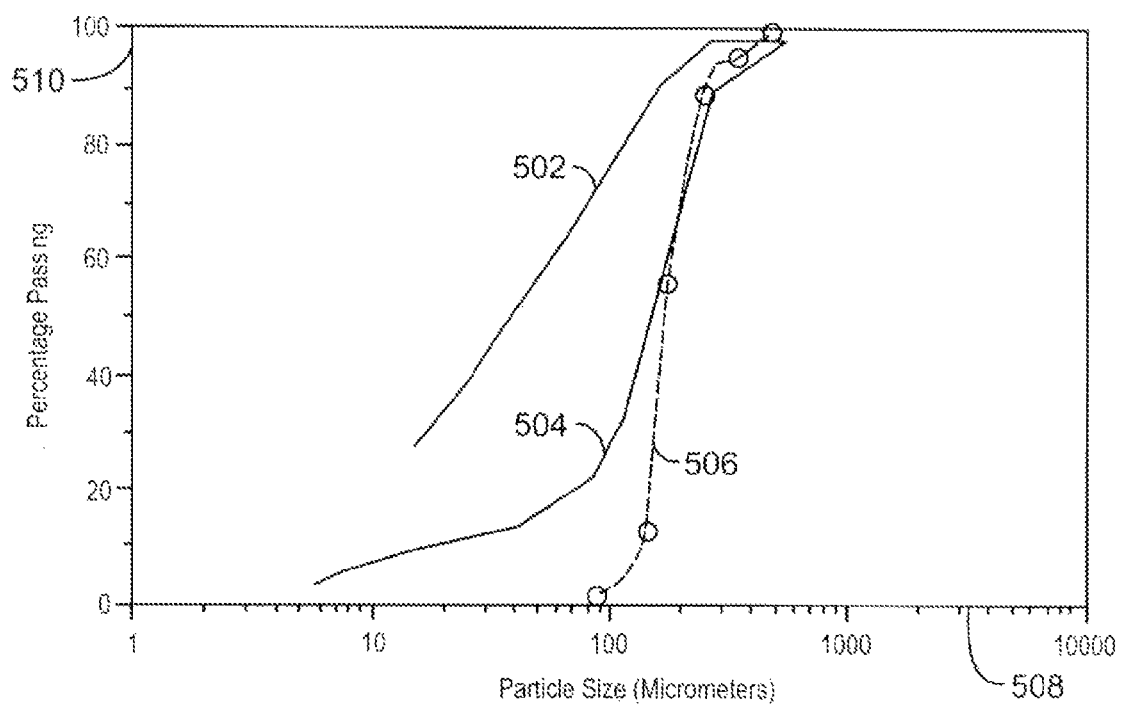
FIG. 5 is a graph comparing different particle size distributions, including total tailings, classified tailings resulting from hydrocyclone fines separation from total tailings, and sieved, i.e., nearly monosized Sand 2.

FIG. 5 is a graph 500 comparing different particle size distributions, including total tailings 502, classified tailings 504 resulting from hydrocyclone fines separation from total tailings, and nearly monosized Sand 2 506. As used herein, tailings are a particular type of particles, generally obtained from a mining or other subsurface process. Any discussion of properties or mixtures of particles applies to tailings and vice-versa. In the graph 500, the x-axis 508 is a logarithmic scale of particle sizes in µm and the y-axis 510 is the percentage of the material passing through a screen at the particle size shown on the x-axis 508. As discussed below, the rheological properties of slurries made from these materials may be used to model backfill properties, such as the slurrified backfilling process described herein.

Figure 6:
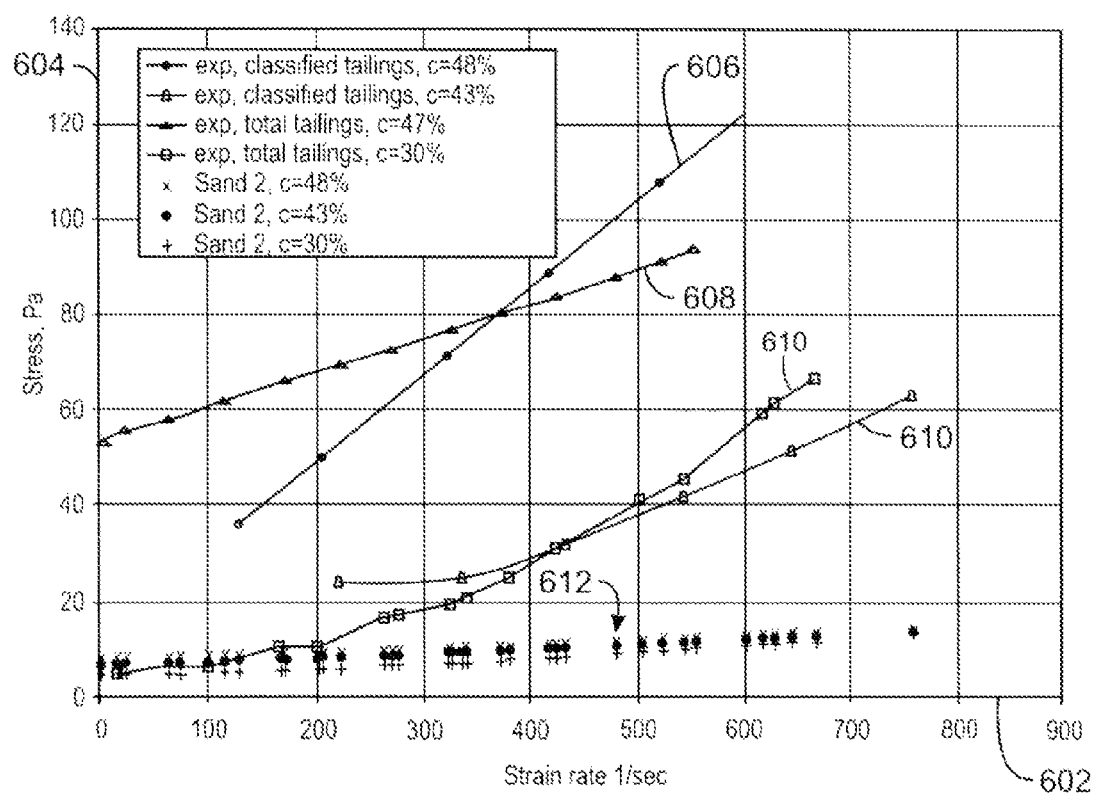
FIG. 6 is a graph that displays the rheological behavior of slurries that may be formed from the solid distributions shown in FIG. 5.

FIG. 6 is a graph 600 that displays the rheological behavior of slurries that may be formed from the solid distributions shown in FIG. 5. In the graph 600, the x-axis 602 represents the strain rate in 1/s and the y-axis 604 represents the measured stress in Pascals. As shown in the graph 600, both size distribution and concentration have a significant effect on rheological behavior. In particular, slurries 606 and 608, which each have particle concentrations at or above the constant particle contact level (~47%), act as Bingham fluids 306 (FIG. 3), e.g., having much higher friction. Less concentrated slurries 610 show shear thickening behavior, acting as dilatant fluids 308. The slurries 606 and 608 can be compared to a plot of monosized sand 612 having a concentration of 30-43% and an average size of 200 nm. Further, slurries with larger fines content show more resistance at higher strain rates.

FIGS. 7 and 8 illustrate the application of pressure gradient versus superficial velocity for slurries. FIG. 7 is a graph 700 comparing the calculated friction loss for a number of systems versus a measured friction loss. In the graph 700, the x-axis 702 represents a logarithmic scale of a mixture velocity in meters per second and the y-axis 704 represents a logarithmic scale of a head loss in %. The friction head loss is a measure of how much pumping power is lost overcoming friction to move a slurry. In a first experiment, a predicted head loss 706 for a sewage sludge having n=0.613, and pipe diameter D=0.157 m was compared to experimental measurements 708 for the same system. Similarly, in a second experiment, a predicted head loss 710 for a kaolin slurry having n=0.843, and pipe diameter D=0.14 m was compared to experimental data 712 for the same system. Finally, a predicted head loss 714 for a kaolin slurry having n=0.613, and pipe diameter D=0.079 m was compared to experimental data 716 for the same system. All three experiments were pseudoplastic fluids 310 (FIG. 3), i.e., n<1. In all three cases the agreement between the predicted head loss 706, 710, and 714 and the experimentally measured head loss 708, 712, and 716 was reasonable.

FIG. 8 is a graph 800 comparing measured pressure gradients to predicted pressure gradients over a range of slurry velocities for two mixtures of tailings. In the graph 800, the x-axis 802 represents the slurry velocity in meters per second, while the y-axis 804 represents the pressure gradient, i.e., the back pressure caused by trying to pump a slurry at the rate shown on the x-axis 802, in kPa/m. As shown in the graph 800, a first experiment 806 was performed on a mixture of classified, or size sorted, tailings, resulting in a predicted curve 808 that can be compared to experimental data 810. Further, a second experiment 812 was performed on a paste of total tailings, resulting in a predicted curve 814 that can be compared to experimental data 816. As for the experiments discussed with respect to FIG. 7, reasonable agreement, e.g., within about 20%, was seen between experiment and predicted values.

Exemplary Tailings Reinjection System

Two backfill materials were chosen to test a design of a continuous flow reinjection system for a slurrified reservoir process. The first test material chosen was Sand 2, having a very narrow particle size distribution, $d_{50}\% \sim 200$ μm and no fines. The second test material chosen for the design test was a dense tailings mixture. The tailings were "classified" (i.e., a combination of coarse and fine tails) and the total tailings were at a concentration of c=47%.

Force equilibrium ensuring continuous backfill in the absence of the back pressure uses a slurry flow rate that matches a friction pressure gradient to a slurry static head, consistent with the formula in Eqn. 9.

$$\nabla p = \frac{2\xi\rho U^2}{D} = \frac{2\xi\rho}{D}\left(\frac{\dot{Q}_4}{0.25\pi D^2}\right)^2 = g(c\rho_s + (1-c)\rho_f) \qquad \text{Eqn. 9}$$

It will be recognized that the friction coefficient $\xi$ is a function of slurry concentration. Thus, the total backfill flow rate $\dot{Q}_4$ is related to the minimum backfill concentration $c_4$ through Eqn. 9. The backfill is achieved by a solids flow rate $\dot{Q}_4 c_4$. The process is not limited to any single rate, as an infinite number of combinations of backfill flow rates and concentrations may be selected.

Figure 9:
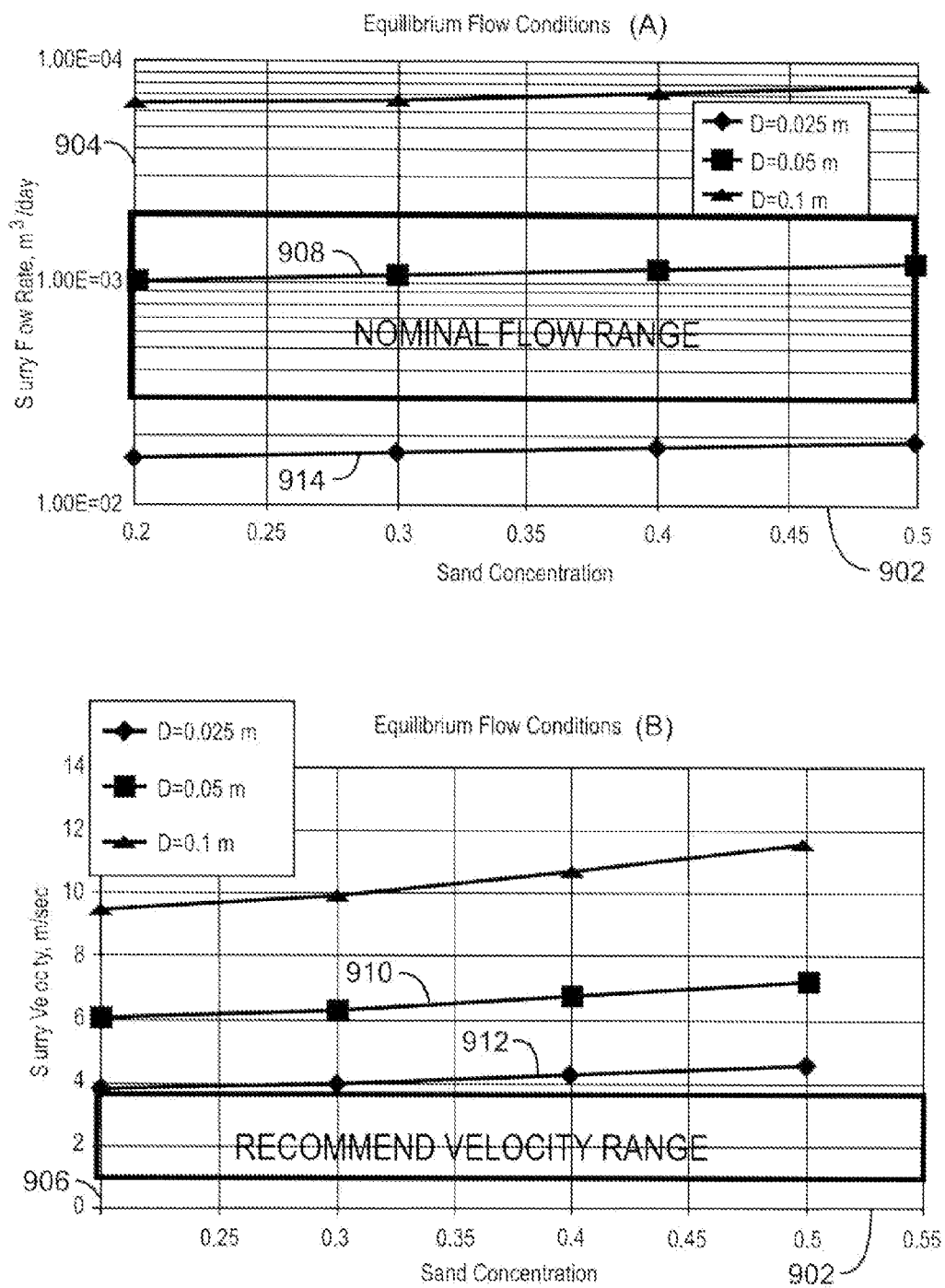
FIG. 9 is a set of two graphs that depict a range of equilibrium flow rates and slurry velocities that can be achieved if Sand 2 were injected through pipes of various diameters.

FIG. 9 is a set of two graphs that depict a range of equilibrium flow rates and slurry velocities that can be achieved if Sand 2 were injected through pipes of various diameters. In each of the graphs, the x-axis 902 represents the sand concentration, $c_4$. In FIG. 9(A), the y-axis 904 represents equilibrium slurry flow rate $\dot{Q}_4$ when there is no significant backpressure. FIG. 9(B) is based on the same basic systems shown in 9(A), except that y-axis 906 is replaced by slurry velocity. As shown in FIG. 9(A), only a pipe of 5 cm in inner diameter (ID) allows a flow rate 908 of slurry within a nominal value for a slurrified backfilling process of 250 m³/day to 1100 m³/day. The flow range is determined by the flow rate that maintains sufficient material flow from an oil sands deposit for economical production of hydrocarbon. However, slurry velocity 910 in a 5 cm pipe will be in range 6 m/s to 8 m/s, as shown in FIG. 9(B), which is above the recommended velocity range due to excessive pipe wear. In contrast, an ID 2.5 cm pipe ensures more or less acceptable slurry velocity 912 but with an equilibrium slurry flow rate 914 that is too low. In an embodiment, several ID 2.5 cm pipes may be used, although this may lead to unnecessary complications in design and maintenance. In other words, the rheology of Sand 2 does not allow enough friction to have an acceptable slurry flow rate at equilibrium without excessive erosion in a single pipe given no backpressure. To overcome these limitations, a mixture of particle sizes, such as in a tailings paste, may be used, as discussed with respect to FIG. 10. In embodiments, an inner pipe string may be used to reduce the cross-sectional flow space through which the mixture flows and, thus, increase flow velocity and friction.

Figure 10:
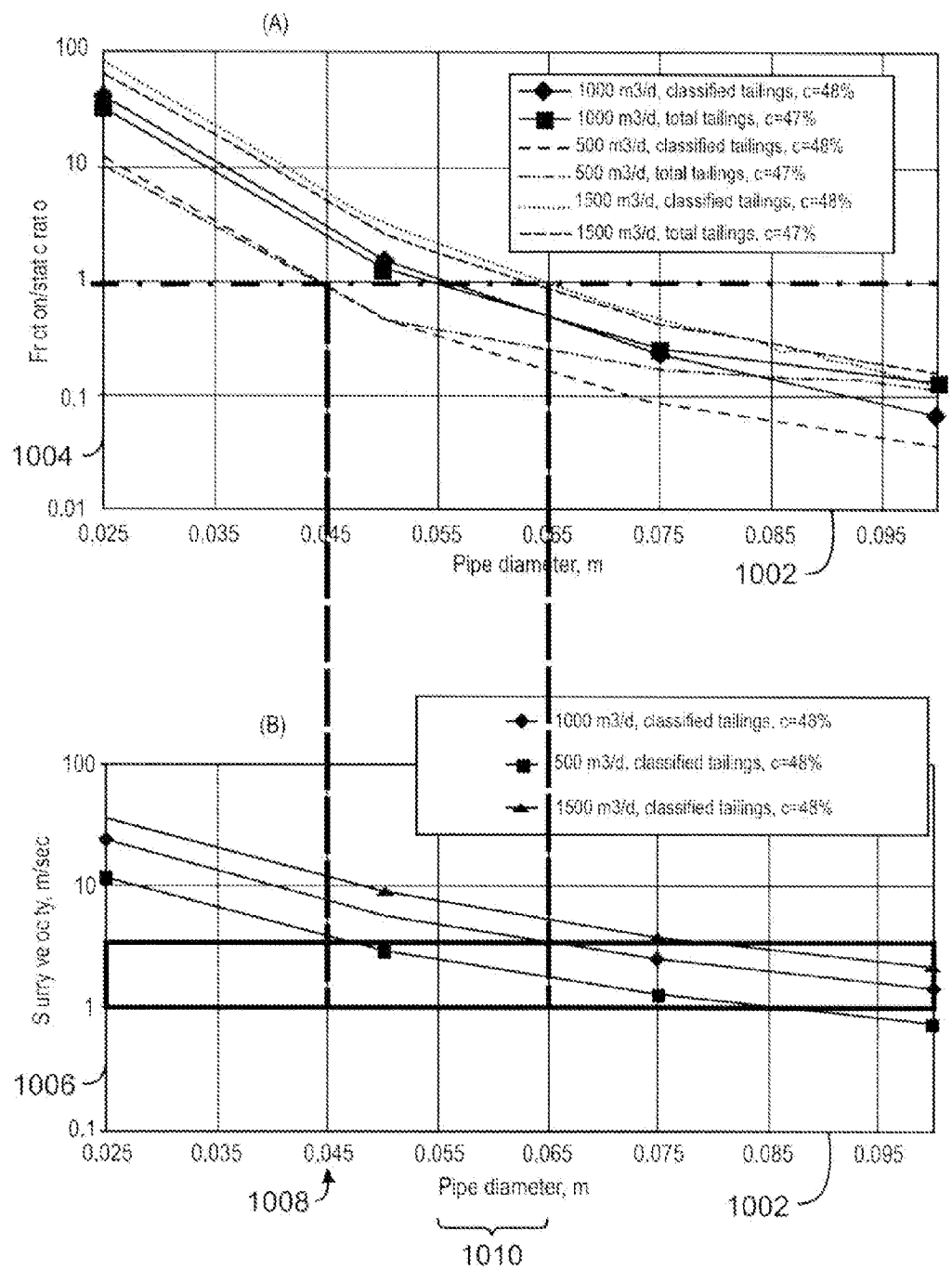
FIG. 10 is a set of two graphs that depict a range of friction/static ratios and slurry velocities that can be achieved if total paste tailings are injected at various volume concentrations in the range 47-48%.

FIG. 10 is a set of two graphs that depict a range of friction/static ratios and slurry velocities that can be achieved if total tailings are injected at various concentrations in a concentration range 47-48%. For both graphs, the x-axis 1002 represents the pipe diameter in meters. The y-axis 1004 in FIG. 10(A) represents a logarithmic scale of a friction to gravity ratio. The y-axis 1006 in FIG. 10(B) represents a logarithmic scale of a slurry velocity. As shown, an ID 4.5 cm pipe 1008 provides a continuous flow regime without erosion for a 500 m³/day backfill flow rate while a pipe 1010 with an ID range of 5.5 cm to 6.5 cm is acceptable for the backfill flow rate range 1000 m³/day to 1500 m³/day.

The backfill water permeability for the slurrified backfilling process should be related to effective cold water permeability $k_5$ of an in-situ oil sand that is in the range of about 0.001 darcy to about 0.5 darcy. As an example, assume a coarse tailings stream has a permeability of cleaned Athabasca sand $k_1$ in the range of about 5 darcy to adopt 20 darcy and a related Blake-Kozeny diameter of about 80 μm, from Eqn. 2. For purposes of this example, another assumption that may be made is that the backfill permeability lies between that of the coarse stream, such as about 5 darcy, and that of in-situ oil sand, at about 0.2 darcy. This assumption stems from the consideration that, on one hand, too high backfill permeability, for example, greater than about 5 darcy, would have resulted in solids settling too quickly underground. The acceptable backfill permeability may be in the high hundreds to low thousands of millidarcies. In one embodiment $k_4$ may be about 1 darcy. Assuming a tailings Blake-Kozeny diameter of about 10 μm, the corresponding fines permeability would be $k_2$=0.078 darcy. From Eqn. 8, a backfill permeability of this value indicates that an acceptable permeability ratio would be $\epsilon = k_4/k_5 = 1$ darcy/0.2 darcy=5. Thus, the corresponding value for the fines fraction $f_4$ is about 0.06350.

Figure 11:
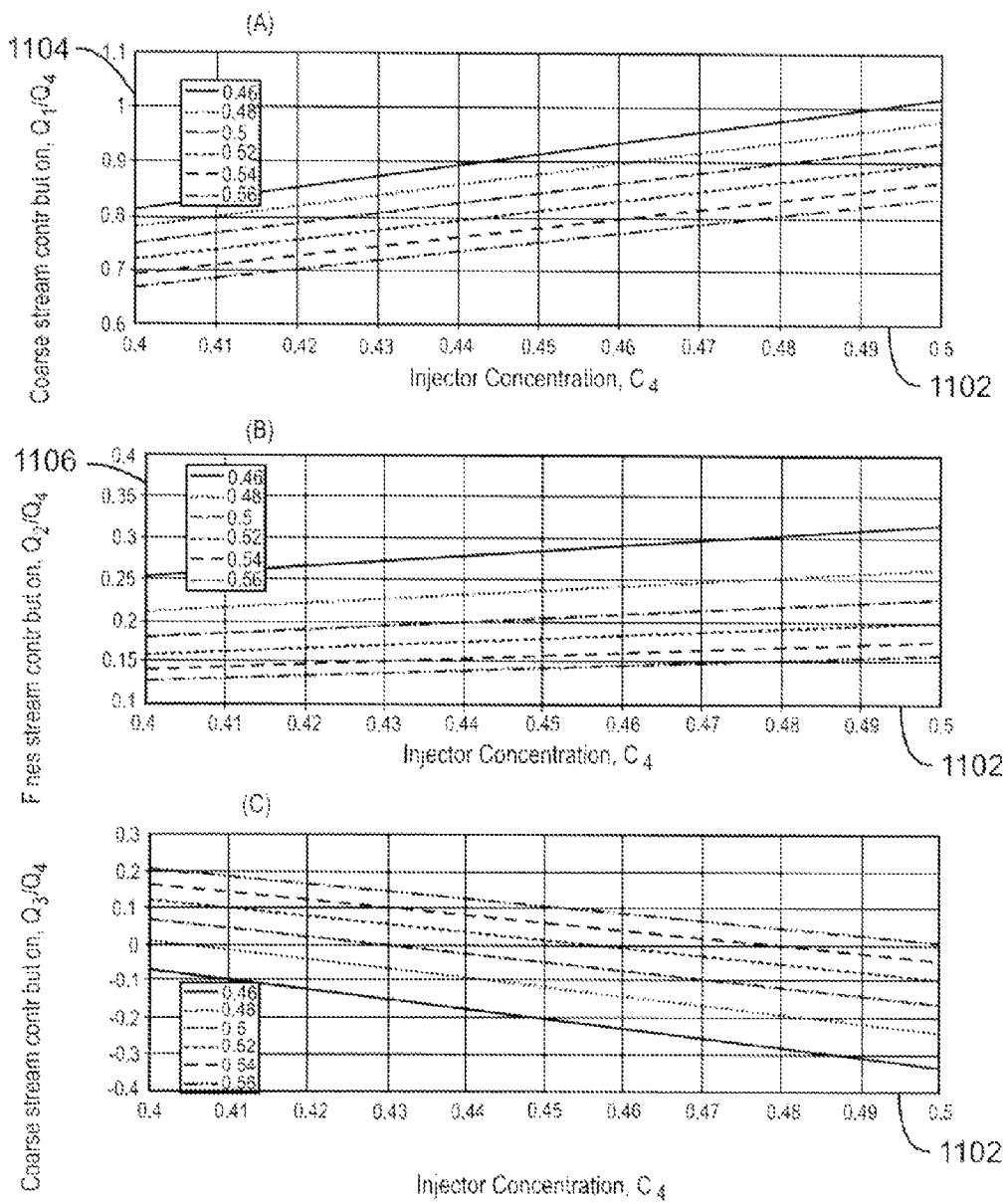
FIG. 11 is a series of graphs displaying the contribution of the coarse stream ($\dot{Q}_1$), fines stream ($\dot{Q}_2$), and the water stream ($\dot{Q}_{f3}$) to a total flow rate ($\dot{Q}_4$) at a fixed fines volume concentration, $c_2$, of about 14%, for a number of backfill concentrations.

FIG. 11 is a series of graphs displaying the contribution of the coarse particle stream ($\dot{Q}_1$), fines particle stream ($\dot{Q}_2$), and the water stream ($\dot{Q}_3$) to a total flow rate ($\dot{Q}_4$) at a fixed fines concentration, $c_2$, of about 14%, for a number of backfill concentrations. In all three graphs, the x-axis 1102 represents the injector concentration of the particular stream. The y-axis 1104 for FIG. 11(A) represents the ratio of the coarse stream to the total flow. The y-axis 1106 for FIG. 11(B) represents the ratio of the fines stream to the total flow. The y-axis 1108 for FIG. 11(C) represents the ratio of the water stream to the total flow.

As an example from the graphs in FIG. 11, if the coarse stream concentration is about 46% and the backfill concentration is about 40%, then dewatering of about 8% will be required. In this example, the coarse stream contributes about 82% of the total flow, and the fines stream contributes about 26% of the total flow, keeping the backfill permeability, $k_4$, at about 1 darcy.

As a further example, if the coarse stream concentration is about 52% and the backfill concentration is about 50%, then dewatering of about 10% will be required. In this example, the coarse stream contributes 90% of the total flow, and fines stream contributes about 20% of the total flow. Such a 50% backfill concentration of paste can be continuously reinjected in a pipe having an ID of 5.5 cm at a rate of about 1000 m³/day with relatively moderate erosion. Therefore, assuming a backfill rate of about 1000 m³/day, the rate of each of the streams in this scenario are about 900 m³/day for the coarse stream, about 200 m³/day for the fines stream, and about 100 m³/day of a water stream obtained from dewatering the streams.

Slurrified Reservoir Backfill Process

FIG. 12 is a block diagram of a slurrified reservoir backfill process 1200. As noted previously, the present techniques are not limited to the slurrified reservoir backfill process 1200, but may be used with any number of filling processes in which particle slurries are injected into cavities. In the slurrified reservoir process 1200, a mixture 1202 of oil sand and water is produced from a reservoir 1204 using an artificial lift 1206, for example, a down well pump. Measurements of the bottom hole pressure 1208 and the sand production rate 1210, $\dot{Q}_s$, provide the information used to select a sand backfilling rate 1212, $\dot{Q}_4 c_4$ and an allowed permeability, based on the required pore pressure to relieve the overburden. The allowed permeability determines the desired size distribution range of the backfill. Further, the allowed permeability allows choosing other parameters 1214, such as a backfill concentration, $c_4$, and flow rate $\dot{Q}_4$, for example, based on the continuity requirement of the backfill and a given diameter 1216 for a reinjection well 1218, as discussed with respect to FIGS. 9 and 10. A slurrified reservoir process surface facility 1220 separates the hydrocarbon 1222 from the mixture 1202 obtained from a production well 1224. The slurrified reservoir process surface facility 1220 produces two solids streams, a coarse tailings stream 1226 and a fines tailings stream 1228.

The adjustment of the concentrations of the coarse tailings stream 1226 and the fine tailings stream 1228 can be accomplished by watering or dewatering in variety of ways. One scheme, shown in FIG. 12, accomplishes dewatering using different techniques for each of the streams 1226 and 1228. In this scheme, a standard solids separator such as a vacuum filter or centrifuge 1230 is used to remove water from the coarse stream 1226. A settling tank 1232 is used to remove water from the fines stream 1228. The settling tank 1232 may also serve as a storage vessel if needed. The coarse stream 1226 is fed through a coarse slurry pump 1234 which may be used to control the flow rate for mixing. Similarly, the fines stream 1228 is fed through a fines slurry pump 1236, which controls the flow rate for mixing.

The mixing of the coarse stream 1226 and the fines stream 1228 is generally performed at the surface 1238, for example, by commingling the streams. Static mixers may be included in the line after the streams 1226 and 1228 are commingled, to provide better mixing control. However, mixing is not limited to the surface, and in some embodiments the streams 1226 and 1228 may be reinjected independently and mixed underground. Dewatering may also be applied at the surface to the streams 1226 and 1228 separately before mixing or an already mixed stream 1240 can be dewatered above or below the surface.

The mixed stream 1240 is then injected into the reservoir 1204 through the injection well 1218. In an embodiment, the flow rate of the mixed stream 1240 is determined from the known backfill concentration, the flow rate and concentrations of coarse and fines tailings coming from slurrified reservoir surface facilities, using the techniques described herein. The flow rates from the corresponding slurry pumps 1234 and 1236 can be used to control the mixing of the coarse stream ($\dot{Q}_1$) 1226 and fines stream ($\dot{Q}_2$) 1228. The flow rates and the control of the pumps and filters of a watering/dewatering system ($\dot{Q}_{f3}$), e.g., centrifuge 1230 or settling tank 1232 can be used to control the rheology of the mixture 1240. The control scheme may be implemented using the method shown in FIG. 13.

Figure 13:
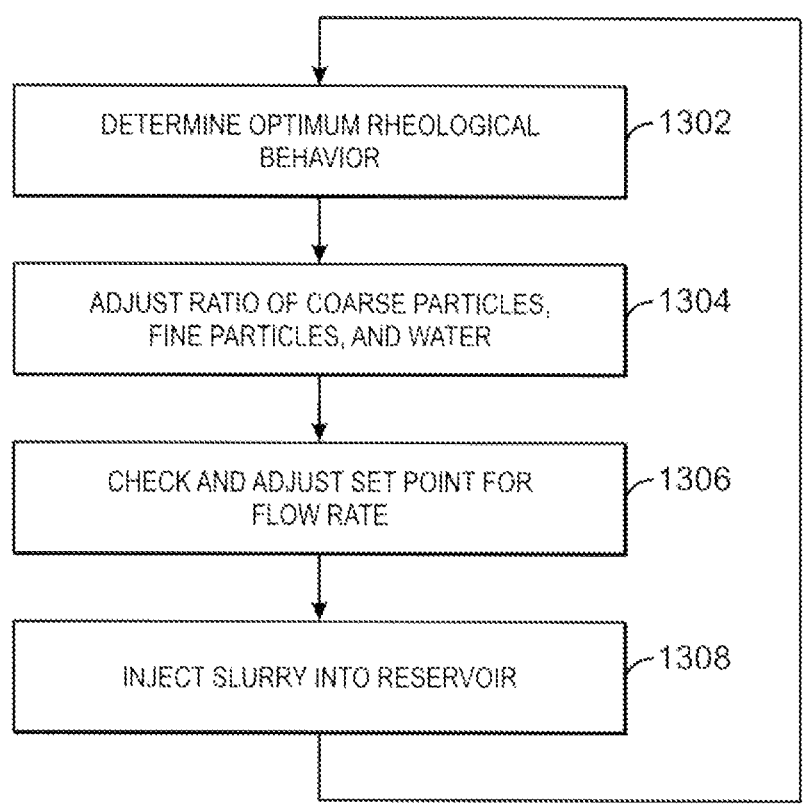
FIG. 13 is a block diagram of a method for controlling a backfill injection process, as described herein.

FIG. 13 is a block diagram of a method 1300 for controlling a backfill injection process, as described herein. The method 1300 begins at block 1302 with a determination of the optimum rheological behavior, for example, using the methods discussed above with respect to Eqns. 1-9. At block 1304, the ratio of a coarse particle stream 1226 (FIG. 12), a fines particle stream 1228, and water needed to reach the rheological behavior is adjusted, for example, by changing the rates of the slurry pumps 1234 and 1236 (FIG. 12) and/or by adjusting the watering/dewatering systems 1230 and 1232. At block 1306, the flow rate of the slurry mixture 1240 is set and/or adjusted. At block 1308, the slurry mixture 1240 is injected into the reservoir 1204. Process control then returns to block 1302 and repeats the method 1300.

A continuous backfill with controlled backpressure may be designed for a slurrified reservoir process. In the slurrified reservoir process, there can be an operating range of flow rates, backfill density, and particle size distribution which allows for continuous backfill. The backfill may be performed using a single well having an inner diameter of about 4 cm to 7 cm and a velocity range of about 1 m/s to 4 m/s, which corresponds to a nominal slurrified reservoir backfill rate range of about 500-1500 m³/day with controllable permeability, slurry density, velocity and pressure. This analysis can be extended to higher backfill flow rates. For example, if production rate of one slurrified reservoir process producer well is 3000 m³/day of slurry with vol. 35% solids concentration, then, after bitumen extraction, the backfill rate of vol. 45% slurry is about 2000 m³/day The backfill solids concentration can be kept high, for example, greater than 45%, to ensure high friction and still acceptable pipe erosion. Accordingly, paste backfilling with a high solids content tailings mixture, for example, >45%, provides a good option. The application of the techniques described herein to the slurrified reservoir process may use measurements obtained from online measurement of bottom hole pressure, production flow rate, and the concentrations of tailings streams coming out of surface facilities. The collected data may be combined with the calculated dependence of the backfill rheology versus the concentration and the allowable fines content, e.g., based on the permeability, to allow the present method to calculate tailings and fluid streams and give suitable commands to system pumps.

Exemplary Control System

Figure 14:
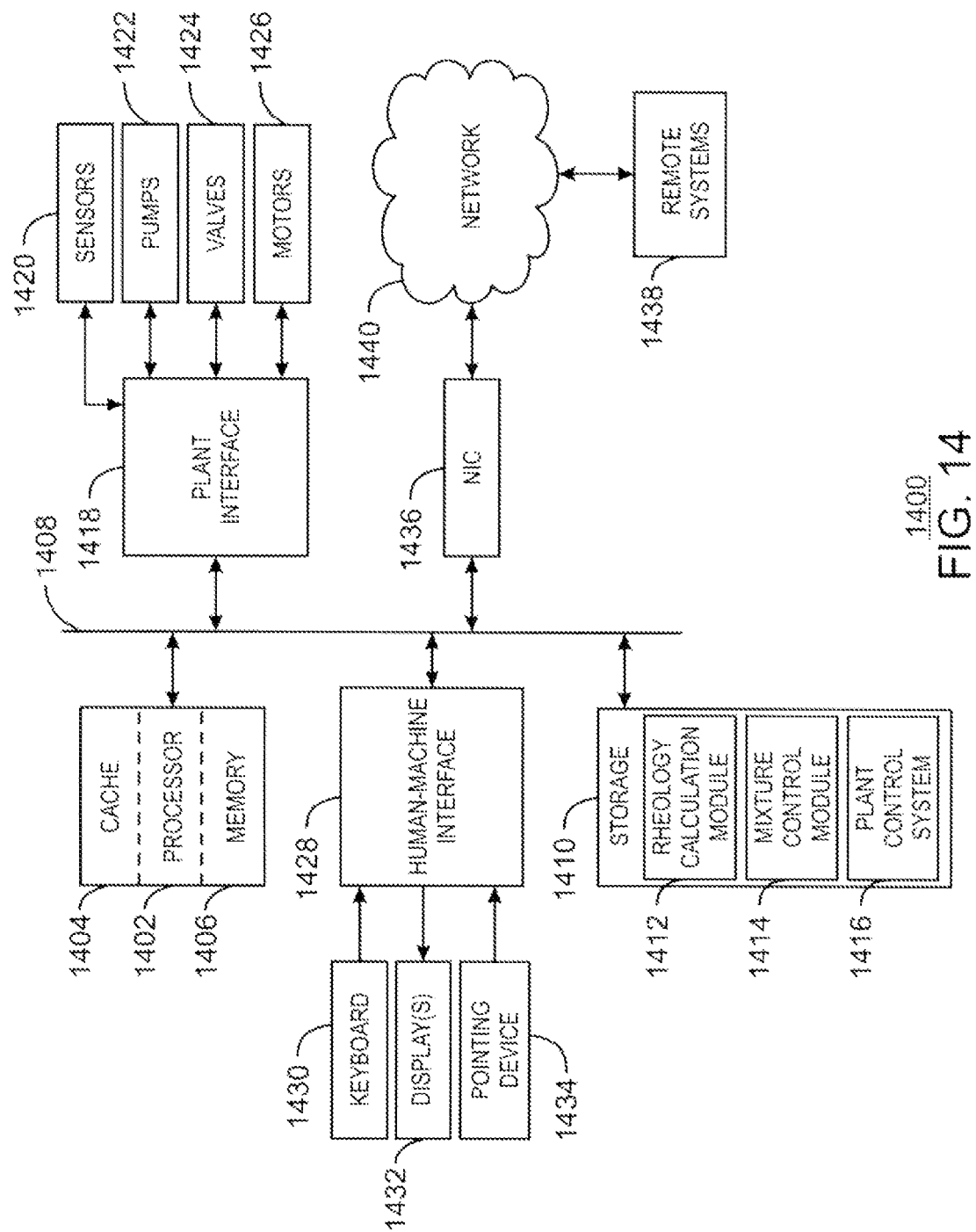
FIG. 14 is a block diagram of a control system that may be used to control a backfill process.

FIG. 14 is a block diagram of a control system 1400 that may be used to control a backfill process. The control system 1400 may be a distributed control system, a direct digital control, a programmable logic controller, or any number of other types of systems. The control system 1400 will generally have a processor 1402 that is associated with a cache 1404 and a memory 1406, such as combinations of random access memory (RAM) and read-only memory (ROM). The memory 1406 is a non-transitory, computer readable medium that may be used to hold programs associated with the techniques described herein, such as the method discussed with respect to FIG. 13, or the techniques described with respect to Eqns. 1-14.

A bus 1408 may be used by the processor 1402 to communicate with other systems, such as a storage system 1410. The storage system 1410 may include any combinations of hard drives, optical drives, RAM drives, holographic drives, flash drives, and the like. The storage system 1410 provides another non-transitory computer readable medium that may be used to hold code for controlling the plant and implementing the techniques described herein. For example, the storage system 1410 may hold a rheology module 1412 for calculating a predicted rheology and flow rate for a backfilling mixture, as described with respect to Eqns. 1-14. Further, the storage system 1410 may hold a mixture control module 1414 that controls slurry pumps and/or watering/dewatering systems to change the composition and rheology of the backfill, for example, based on the results from the rheology module 1412. The storage system 1410 may also include a plant control system module 1416 that operates the specific plant equipment.

For example, the processor 1402 may access the plant control system module 1416 and use the module to communicate with a plant interface 1418 through the bus 1408. The plant interface 1418 may include hardware, software, or both used to collect data from sensors 1420, control pumps 1422, open and close valves 1424, and control motors 1426 on equipment such as mixers, conveyors, vacuum pumps, and the like.

The plant control system 1400 may have a human-machine interface 1428 that allows operators to interface to the control system. The human-machine interface 1428 may couple input and output devices, such as keyboards 1430, displays 1432, and pointing devices 1434 to the bus 1408.

The plant control system 1400 may also include a network interface, such as a network interface card (NIC) 1436 to allow remote systems 1438 to communicate with the plant control system 1400 over a network 1440. The network 1440 may be a local area network (LAN), a wide area network (WAN), the Internet, or any other appropriate network.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method of backfilling a subsurface formation comprising:
   forming a mixture of tailings from at least a first tailings stream and a second tailings stream, wherein the first tailings stream and second tailings stream are produced from one or more hydrocarbon recovery processes and have different particle size distributions and the mixture is comprised of a fluid;
   varying the fluid content of the mixture to control the rheology of the mixture; and
   injecting the mixture having the controlled rheology through a pipe into the subsurface formation;
   wherein the permeability of the mixture is between about 0.01 and about 10 times an initial permeability of a material in a subsurface formation.

2. The method of claim 1, wherein the subsurface bitumen.

3. The method of claim 1, wherein a mass-averaged median diameter of the particles of the first tailings stream is larger than a mass-averaged median diameter of the particles of the second tailings stream.

4. The method of claim 1, wherein varying the fluid content of the mixture comprises adding a fluid to the mixture to control the rheology of the mixture, the density of the mixture, or both.

5. The method of claim 1, wherein varying the fluid content of the mixture comprises adding a fluid the second tailings stream to control the rheology of the mixture, the density of the mixture, or both.

6. The method of claim 1, wherein varying the fluid content of the mixture comprises removing a fluid from the mixture to control the rheology of the mixture, the density of the mixture, or both.

7. The method of claim 1, wherein the rheology of the mixture, the density of the mixture, or both, is controlled to adjust a frictional pressure loss of the mixture during a flow through a pipe or a wellbore.

8. The method of claim 1, further comprising controlling a ratio of mixing between the first tailings stream and the second tailings stream based, at least in part, on a real-time estimate of averaged particle sizes, particle size distributions, permeability, rheology, or density for one of the first tailings stream and the second tailings stream.

9. The method of claim 1, further comprising controlling a ratio of mixing between the first tailings stream and the second tailings stream to control, at least in part, an injection rate of the mixture.

10. The method of claim 1, further comprising controlling a ratio of mixing between the first tailings stream and the second tailings stream to control, at least in part, an erosion rate of the pipe due to the mixture flow.

11. The method of claim 1, wherein the subsurface formation is located at a depth of least about 50 meters.

12. The method of claim 1, further comprising controlling a ratio of mixing the first tailings stream and the second tailings stream based, at least in part, on a real-time measurement of averaged particle sizes, particle size distributions, or rheology of one or more particle sources or the resulting mixture.

13. The method of claim 1, wherein the rheology of the mixture is controlled so that the mixture does not free fall in the pipe during injection.

14. The method of claim 1, wherein an injection pipe includes an inner pipe to reduce a cross-sectional flow space.

15. The method of claim 1, wherein the mixture is formed at the surface in a blending apparatus.

16. The method of claim 1, wherein the mixing is performed in a subsurface region by commingling of the outlets of two or more pipes.

17. The method of claim 1, wherein the first tailings stream is comprised of coarse particles and the second tailings stream is comprised of fine particles.

18. The method of claim 1, wherein tailings are produced from part or the whole of material produced from the subsurface formation.

19. The method of claim 1, wherein the rheological property is controlled, at least in part, by addition of a chemical additive.

20. The method of claim 19, wherein the chemical additive comprises a polymer, a gelling agent, a flocculent, a pH modifier, or any combinations thereof.

21. The method of claim 1, wherein at least one of the first tailings stream and the second tailings stream comprise tailings produced from a slurrified heavy oil reservoir extraction process.

22. The method of claim 21, wherein the slurrified heavy oil reservoir extraction process is a Clark hot water extraction process.

23. The method of claim 1, further comprising removing a fluid from the second tailings stream to control the rheology of the mixture, the density of the mixture, or both.

24. The method of claim 23, wherein the fluid is removed in a thickener vessel.

25. The method of claim 23, wherein the fluid is removed with an addition of coagulation agents.

26. The method of claim 1, wherein varying the fluid content of the mixture comprises adding a fluid to the first tailings stream to control the rheology of the mixture, the density of the mixture, or both.

27. The method of claim 26, wherein varying the fluid content of the mixture comprises removing a fluid from the first tailings stream to control the rheology of the mixture, the density of the mixture, or both.

28. The method of claim 27, wherein the fluid is removed from the first tailings stream by a centrifuge, a vacuum belt, a vibrating screen filter, or any combinations thereof.

29. A method for harvesting hydrocarbons from a reservoir, comprising:
   drilling an injection well to a reservoir;
   drilling a production well to the reservoir;
   producing a material from the production well, wherein the material comprises a mixture of particulate solids and hydrocarbons;
   removing at least a portion of the hydrocarbons from the material;
   forming a plurality of particulate streams from the material;
   forming a mixture comprising at least two of the plurality of particulate streams, wherein the ratio between each of the plurality of particulate streams is controlled to control a permeability of the mixture;
   controlling a water content of the mixture to adjust a rheological property of the mixture; and
   injecting the mixture through the injection well into the reservoir at the same rate as production of the material from the reservoir.

30. The method of claim 29, further comprising processing a hydrocarbon removed from the material.

31. The method of claim 29, wherein the reservoir comprises a hydrocarbon and a sand.

32. The method of claim 29, wherein the reservoir comprises bitumen.

33. The method of claim 29, wherein the mixture comprises residual hydrocarbons.

* * * * *